(12) United States Patent
de La Chapelle et al.

(10) Patent No.: US 7,027,767 B2
(45) Date of Patent: Apr. 11, 2006

(54) MOBILE PLATFORM LOCAL AREA NETWORK USING DIRECT INFRARED

(75) Inventors: Michael de La Chapelle, Bellevue, WA (US); Barbara A. Capron, Sammamish, WA (US); John A. Bell, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 546 days.

(21) Appl. No.: 10/023,111

(22) Filed: Dec. 17, 2001

(65) Prior Publication Data

US 2003/0114178 A1 Jun. 19, 2003

(51) Int. Cl.
*H04H 1/00* (2006.01)
*H04H 7/00* (2006.01)
(52) U.S. Cl. ............... 455/3.06; 455/3.01; 455/41.2
(58) Field of Classification Search .............. 455/3.01, 455/3.02, 3.03, 3.04, 3.05, 3.06, 7, 41.1, 455/41.2, 41.3, 507, 508, 90.1, 90.2, 90.3, 455/11; 370/310, 310.1, 310.2, 315, 316; 398/115, 118, 127–131, 173, 141, 140; 725/74–85
See application file for complete search history.

(56) References Cited

U.S. PATENT DOCUMENTS

| 5,880,867 A | * | 3/1999 | Ronald ..................... 398/119 |
| 6,249,913 B1 | | 6/2001 | Galipeau et al. |
| 6,477,152 B1 | * | 11/2002 | Hiett ......................... 370/316 |

FOREIGN PATENT DOCUMENTS

GB 2347806 * 9/2000

* cited by examiner

*Primary Examiner*—Edan Orgad
(74) *Attorney, Agent, or Firm*—Harness Dickey & Pierce P.L.C.

(57) ABSTRACT

A system for providing wireless communication within a local area network (LAN) onboard a mobile platform. The system includes at least one seat transceiver located in a passenger seating area, and at least one passenger service unit (PSU) located above the passenger seating area. The PSU includes at least one PSU transceiver. Additionally, the system includes a direct path infrared (IR) signal transmission link between the seat transceiver and the PSU transceiver. The direct path IR transmission link transmits data between the seat transceiver and the PSU transceiver.

18 Claims, 3 Drawing Sheets

MOBILE PLATFORM LOCAL AREA NETWORK USING DIRECT INFRARED

FIELD OF THE INVENTION

The invention relates generally to local area networks (LANs) onboard mobile platforms, and more particularly to direct path infrared (IR) signal transmission between a passenger seat and an overhead passenger service unit (PSU).

BACKGROUND OF THE INVENTION

Mobile platforms, such as planes, trains, buses, and ships, often must be quickly and easily reconfigured to accommodate changing seating requirements, and to accommodate varying combinations of passenger and cargo payloads. Typically, the task of seat reconfiguration is made difficult by the presence of a multitude of wires and cables running through the floor and seat tracks to provide audio and video entertainment, telephone services, reading light controls, connection to a LAN for Internet access, and electrical power to the passenger seats.

Not only does the multitude of wiring in the seat track make seat reconfiguration difficult, but also the weight of the many wires and cables reduces performance of the mobile platform, such as fuel economy, range, and payload. Additionally, the reliability of seat cabling is poor because the seat environment is hostile. Seat connectors and cables are often damaged or tampered with by passengers and the cabin floor environment can be dirty and wet. The cost of repair and maintenance on seat wiring is a significant expense.

Furthermore, PSUs that provide signal distribution and service switching are typically located under the passenger seats. Location of the PSUs under the passenger seats occupies valuable passenger legroom and storage space, and expose the PSUs to a harsh environment.

At least one wireless IR systems has been implemented to abate the problems with wired systems. Such a system works by flooding the cabin with diffuse and non-directional IR signals to be distributed to the passenger seats. With diffuse IR systems, received signal power is very limited because of scattering off of cabin walls, ceiling, seats, etc. The signal level can vary widely with propagation path changes caused by cabin reconfiguration, seats reclining, service cart movement, and passenger movement. Additionally, diffuse IR receivers gather light over large acceptance angles making them more sensitive to background light interference. Furthermore, diffuse wireless IR signal distribution does not support wide bandwidth video transmission because of low received signal amplitude. Further yet, to avoid interference, all passengers receive the same signal so they must share the very limited signal bandwidth.

Therefore, it is desirable to provide a LAN onboard a mobile platform that relocates the PSUs from below the passenger seats, eliminates wires and cables to the passenger seat, and avoids the problems associated with diffuse IR signal distribution by providing a direct path wireless IR link between the seat and the PSU.

BRIEF SUMMARY OF THE INVENTION

In one preferred embodiment a method is set forth for providing wireless communication within a local area network (LAN) located on a mobile platform. The LAN includes at least one seat transceiver located in a passenger seating area, and at least one passenger service unit (PSU), including a PSU transceiver, for exchanging communications with the seat transceiver. The method locates the PSU above the passenger seating area, provides a direct path IR signal transmission link between the seat transceiver and the PSU transceiver, and transmits data between the seat transceiver and the PSU transceiver using the direct path IR transmission link.

In another embodiment, a system is set forth for providing wireless communication within a local area network (LAN) onboard a mobile platform. The system includes at least one seat transceiver located in a passenger seating area, and at least one passenger service unit (PSU) located above the passenger seating area. The PSU includes at least one PSU transceiver. Additionally, the system includes a direct path infrared (IR) signal transmission link between the seat transceiver and the PSU transceiver. The direct path IR transmission link transmits data between the seat transceiver and the PSU transceiver.

In yet another embodiment, a method is set forth for providing wireless communication within a local area network (LAN) located on a mobile platform. The LAN includes at least one seat transceiver located in a passenger seating area, and at least one passenger service unit (PSU), including a PSU transceiver, for exchanging communications with the seat transceiver. The method locates the PSU above the passenger seating area, provides a direct path IR signal transmission link between the seat transceiver and the PSU transceiver, provides a redundant optical signal path to reduce signal interference, and provides at least one interface connected to the seat transceiver, such that a passenger can connect a network enabled personal computing device (PCD), such as a notebook computer or PDA, to the interface port and thereby access the LAN.

BRIEF DESCRIPTION OF THE DRAWINGS

The present invention will become more fully understood from the detailed description and the accompanying drawings, wherein.

DETAILED DESCRIPTION OF THE INVENTION

Figure 1:
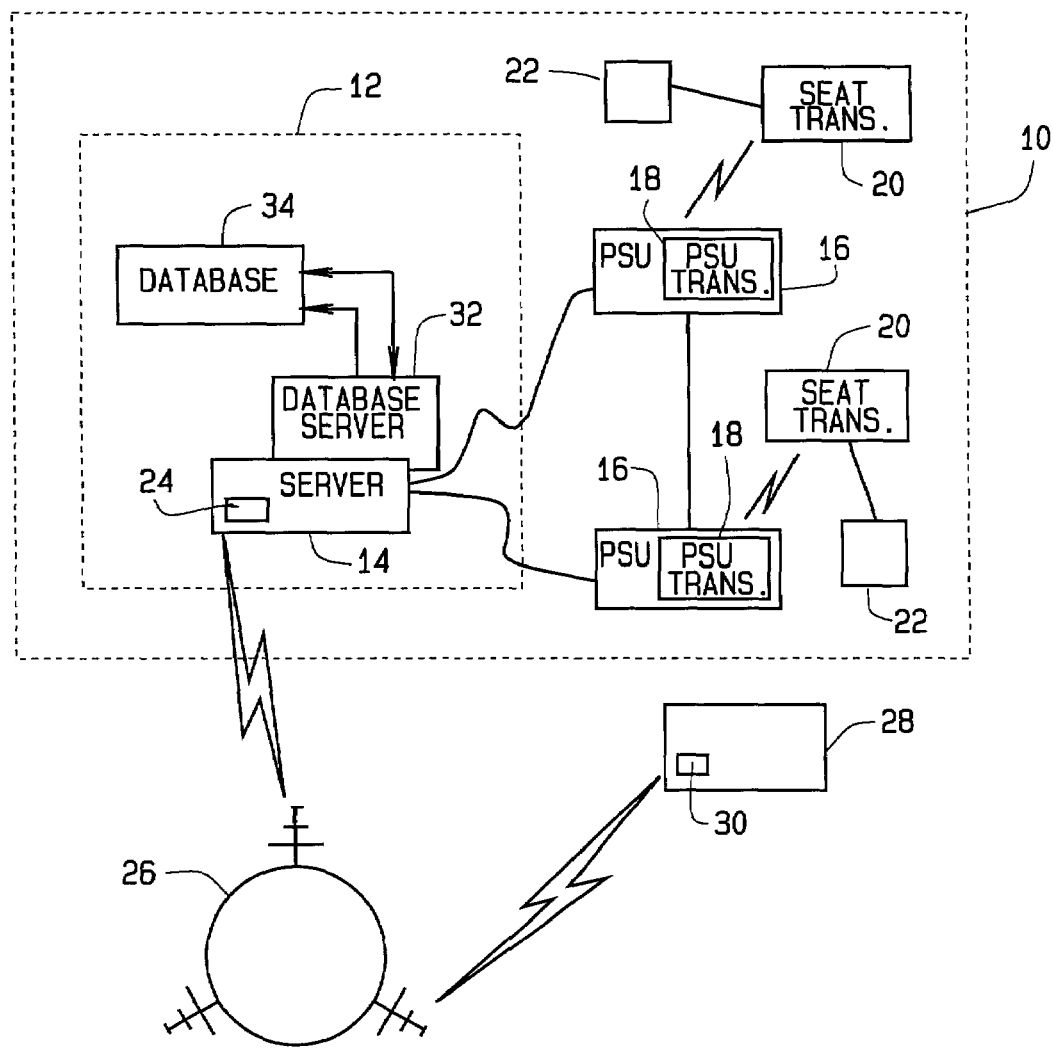
FIG. 1 is a simplified block diagram of a network system for providing wireless communication on a mobile platform, in accordance with a preferred embodiment of the present invention.

FIG. 1 is a simplified block diagram of a network system 10 for providing wireless communication on a mobile platform, in accordance with a preferred embodiment of the present invention. As used herein, a mobile platform is any platform not having a permanently fixed location, such as a plane, train, bus, or ship. Network system 10 includes a server system 12, which includes at least one server 14. Additionally, network system 10 includes a plurality of passenger service units (PSUs) 16 connected to server 14, and including a PSU transceiver 18. Furthermore, network system 10 includes at least one seat transceiver 20 communicatively connected to one or more respective PSUs 16, via a direct infrared (IR) signal. PSUs 16 are located in an overhead compartment above seat transceivers 20. A passenger, or client, located at, or onboard, the mobile platform, can connect a client system 22 to any seat transceiver 20, and thereby access server 14. Client system 22 is any network enabled personal computing device (PCD) appropriately configured to perform two-way communication with server 14, such as a suitably equipped laptop computer, personal data assistant, or cell phone.

Seat transceiver 20 includes, or is connected to, an interface (not shown) to which a client, or passenger, connects client system 22 using a cable and connector (not shown). The interface is any interface that will allow transmission of data, such as an Ethernet RJ45 interface, a firewire interface, or an USB interface. A standard network communication protocol, such as Ethernet, is used for communication between server 14 and client system 22.

Network system 10 is a shared network such as a local area network (LAN). In an exemplary embodiment, server 14 includes a satellite communication modem 24 that enables server 14 to communicate with a terrestrial Internet, via at least one satellite 26 and a ground station 28, which also includes a satellite modem 30 for communicating with satellite 26. The details of providing data service from a ground station, such as ground station 28, to a server on a mobile platform, such as server 14, via a satellite communication link, are set fourth in U.S. patent application Ser. No. 09/639,912, titled Method and Apparatus for Providing a Bi-Directional Data Service and Live Television Programming to a Mobile Platform, filed Aug. 16, 2000, the disclosure of which is incorporated herein by reference.

Client systems 22 include a web browser (not shown), such that client systems 22 can access Internet data content cached on server 14 or delivered to the mobile platform using satellite communication links. To access Internet data content using client systems 22, server 14 establishes a satellite link with ground station 28 using server satellite modem 24, satellite 26, and ground station satellite modem 30, ground station 28 communicates with the terrestrial Internet and provides Internet content data to server 14, via the satellite link. Thereafter, server 14 provides the Internet data content to client systems 22, via the direct IR link between PSU 16 and seat transceiver 20.

In one embodiment, server system 12 includes a database server 32 connected to a centralized database 34, which electronically stores data used by server 14. Centralized database 34 can be accessed by clients, or passengers, at one of the client systems 22, and can be located either remotely from server 14, or included in sever 14. In an alternate embodiment, server system 12 does not include database 34 and database server 32, but instead includes one or more servers 14, which include an electronic data storage device (not shown) that electronically stores data used by server 14.

Figure 2:
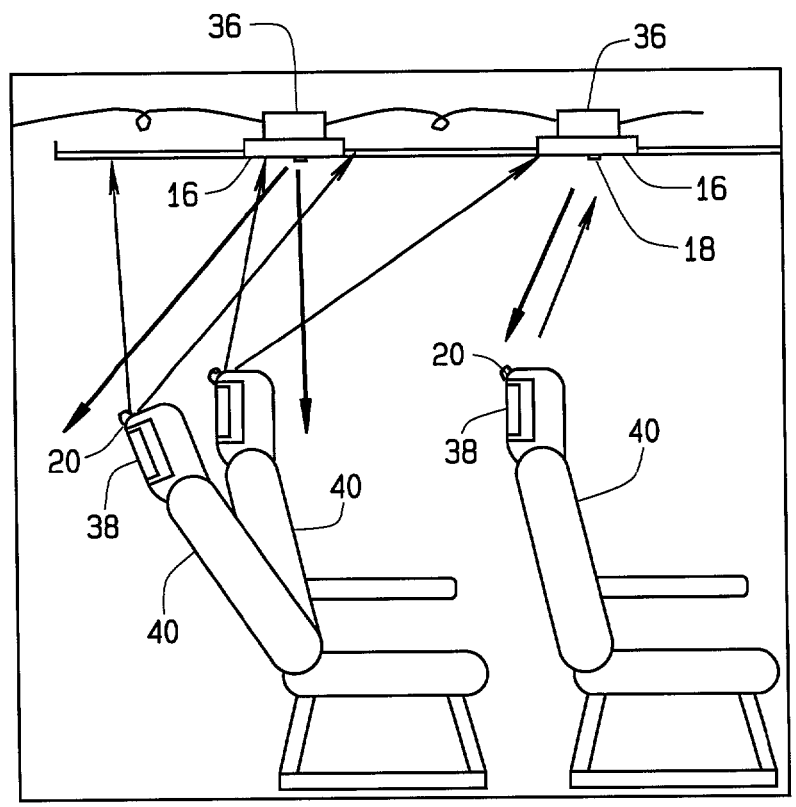
FIG. 2 is a graphical representation showing one embodiment of a direct path infrared signal between a seat transceiver and a passenger service unit of the network system shown in FIG. 1.

FIG. 2 is a graphical representation showing the direct path IR signal between seat transceiver 20 and PSU transceiver 18 of network system 10 (shown in FIG. 1). Components in FIG. 2, identical to components in FIG. 1, are identified in FIG. 2 using the same reference numerals as used in FIG. 1. Network system, or LAN, 10 directs an intense bi-directional IR beam from PSU transceiver 18 to a particular seat transceiver 20, group of seat transceivers 20, or client system 22. The direct IR signal is used to provide conventional Internet services to seat transceiver 20 or client system 22. These Internet services included, but are not limited to, web browsing, e-mail, streaming audio/video, IP telephony, and VPN connectivity. For example, the uplink is used to request Internet data services, such as web page content, and e-mail, and other services, such as audio and video entertainment, keypad and joystick inputs, and passenger seat lighting, while the downlink delivers the requested Internet data services, audio and video entertainment and other services to seat transceiver 18. Alternatively, video content stored on server 14 may be requested and delivered as streamed Internet protocol (IP) packets.

The content accessed and delivered through the IR uplink and downlinks may be stored on servers 14, or database 34, or the content may come from the terrestrial Internet through the satellite communications link between server 14 and the ground station 28 (shown in FIG. 1).

An electronic unit 36 is mounted behind each PSU 16. Each electronic unit 36 is a node in LAN 10 interconnecting all PSUs 16. Requests for services are initiated by a passenger using a seatback display unit 38, or client system 22 (shown in FIG. 1), and transmitted to seat transceiver 20. Seatback display unit 38 is located in the back of a passenger seat 40. The request is then uplinked from seat transceivers 20 to overhead PSU transceivers 18, where the request is then transmitted through LAN 10 to the nodes providing the service. The requested services are transmitted back to PSU transceivers 18 on LAN 10, downlinked to seat transceiver 20, and then transmitted to the passenger. In an alternative embodiment, seatback display 38 is a line replaceable unit (LRU) including a video display and support electronics, such as video decompression, demuxing, and LED drivers.

The direct path IR transmission link requires a direct and unobstructed path between overhead PSU transceiver 18 and seat transceiver 20. Therefore, PSUs 16, and PSU transceivers 18, are located in a position above passenger seats 40 where PSU transceivers 20 can provide direct IR illumination to passenger seats 40. The overhead location of PSU 16 provides an IR signal propagation path between PSU transceiver 18 and seat transceiver 20, which is not blocked by aisle passenger traffic.

Each seat transceiver 20 is included in, or attached to, seatback display unit 38, and the optimum location for seat transceiver 20 is dependent on the physical and functional characteristics of passenger seat 40. Preferably seat transceiver 20 is located as high as possible off of the floor to prevent beam blockage between PSU transceiver 18 and seat transceiver 20. Any location on seat 40 below the top of the passenger's head, while seated, may block the IR signal for an unacceptable percentage of time due to passenger movement. In one embodiment, seat transceiver 20 is located on top of seatback display unit 38, which is attached to the top back portion of passenger seat 40, where there is a normally unobstructed path to PSU transceiver 18.

Downlink data from the overhead PSU transceiver 18 is transmitted to the seatback display unit 38, or client system 22 operated by a passenger in the passenger seat 40 located behind the seat transceiver 20 in which the data is received. For example, when the passenger in passenger seat 40 located in row 6 requests a specific video channel number, a switching unit (not shown), included in PSU 16, directs the channel number to PSU transceiver 18 above row 5.

In an alternate embodiment, seatback display unit 38 includes the interface to which client system 22 can be connected, and seat transceiver 20 is located on top of seatback display unit 38, as described above. Therefore, seatback unit 38 serves as a display unit for passengers not using client system 22, and provides a connection point to network system 10 for passengers using client system 22. In another alternate embodiment, PSU transceiver 18 establishes a direct IR link with client system 22 that includes a built-in IR transceiver port (not shown). Therefore, neither seat transceiver 20, or seatback display unit 38 is not utilized.

Figure 3:
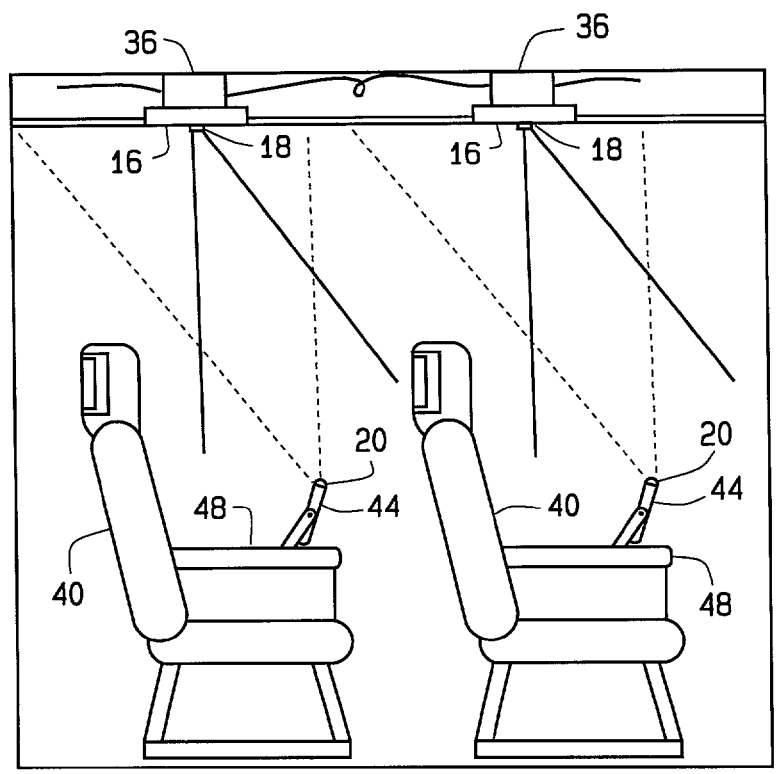
FIG. 3 is a graphical representation showing another embodiment of a direct path infrared signal between a seat transceiver and a passenger service unit of the network system shown in FIG. 1.

FIG. 3 is a graphical representation showing an alternate embodiment of the direct path IR signal between seat transceiver 20 and PSU transceiver 18 of LAN 10 (shown in FIG. 1). Components in FIG. 3, identical to components in FIG. 1, are identified in FIG. 3 using the same reference numerals as used in FIG. 1. Passenger seat 40 includes a video display 44 that folds out of an armrest 48 of passenger seat 40. Seat transceiver 20 is located on top of a video display 44. The top of video display 44 is elevated above the passenger's lap and arms so that the IR beam has the least chance of being blocked. In yet another embodiment, seat transceiver 20 is mounted on a supporting arm of video display 44 so that video display 44 can be tilted without hindering the direct IR path between PSU transceiver 18 and seat transceiver 20.

Figure 4:
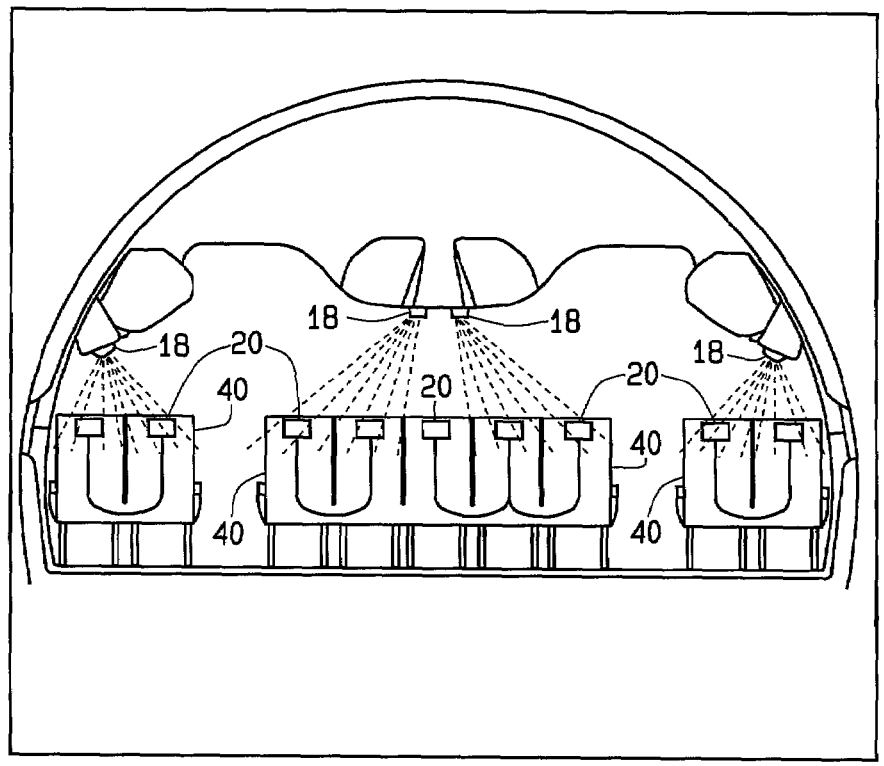
FIG. 4 is a graphical representation showing a beam shape of a direct path infrared signal between a seat transceiver and a passenger service unit transceiver of the network system shown in FIG. 1.

FIG. 4 is a graphical representation showing the beam shape of the direct path IR signal between seat transceiver 20 and PSU transceiver 18 of LAN 10 (shown in FIG. 1). Components in FIG. 4, identical to components in FIG. 1, are identified in FIG. 4 using the same reference numerals as used in FIG. 1. An IR link is established when there is overlap between a transmit beam of PSU transceiver 18 and an acceptance cone of seat transceiver 20. The transmitter of PSU transceiver 18 is aimed so that the transmitter illuminates the receiver of seat transceiver 20, and the receiver is aimed so that the transmitted light falls within the acceptance cone of seat transceiver 20. This spatial filtering provided by the transmitter and receiver optics prevents interference from adjacent IR links.

In the preferred embodiment, each PSU transceiver 18 illuminates a plurality of seat transceivers 20. By illuminating more than one seat transceivers 20 there is a reduced chance of signal interference when passenger seats 40 are closely packed, and it is less expensive to service more than one seat with each transmitter. Additionally, aiming tolerances of PSU transceiver 18 and seat transceivers 20 are relaxed, such that there is a redundant optical path between PSU transceiver 18 and the plurality of seat transceivers 20. Additionally, adjacent seat transceivers pairs, triples or quads in a seat group are interconnected using wiring, and the downlink and uplink seat group data is continuously multiplexed. Therefore, if one seat transceiver 20 is blocked, the redundant optical path to an adjacent seat transceiver 20 allows the blocked seat transceiver 20 to continue communicating with PSU 16.

In the preferred embodiment, the transmission signals for both the uplink and downlink are in a digital format. The digital signal provides superior quality video and audio, uses less signal bandwidth, provides compatibility with present and future systems, provides simpler and lower cost networking and switching, and provides better performance than an analog signal. Additionaly, PSU 16 filters off the content, or data packets, to the seat or seat group that they are serving. Thus, the full bandwidth of network system 10 interconnecting each PSUs 16 and server 14 is not transmitted on the IR link between seat transceiver 20 and PSU 16. Only the content, or data packets, originating at the seat, or destined for the seat, is transmitted. This greatly reduces the bandwidth requirements on the optical link between PSU 16 and seat transceiver 20 making it possible to use inexpensive components such as LEDs.

In one embodiment, the video downlink from PSU 16 to seat transceiver 20 conveys up to three video channels for a seat group. The channels are digitally compressed using any one of a wide variety of compression standards, such as MPEG-1 or MPEG-4.

Network system 10 architectures can have a wide range of connection topologies for interconnecting server 14 to each PSU 16. For example, topologies can be a daisy chain, a star, or hybrids thereof. The daisy chain configuration is popular on aircraft because of the reduced wiring. Star configurations are also popular because they offer greater reliability. Additionally, network system 10 is capable of using a wide range of data transmission protocols, or standards, for conveying data between server 14 and PSU 16. For example, commercial standards, such as Ethernet, FDDI, and Token Ring, are all compatible. Furthermore, the media used to convey data between server 14 and PSU 16 may be either wire or optical fiber.

Referring to FIG. 1, the data transmitted by the direct IR signal, from PSU transceiver 18 to seat transceiver 20 is coded because the raw data may not contain sufficient data transitions for proper timing recovery at seat transceiver 20, and the data may be DC level imbalanced causing errors at seat transceiver 20. Insufficient data transitions and DC level imbalance are caused by long strings of ones or zeros in the data. To prevent these problems, the data is coded to make it DC level balanced and to guarantee enough transitions for timing recovery. Either random coding or block coding may be used. Additionally, seat transceiver is AC coupled to filter off the high DC levels produced by intense background light, which can result in performance degradation when using DC imbalanced codes.

Figure 5:
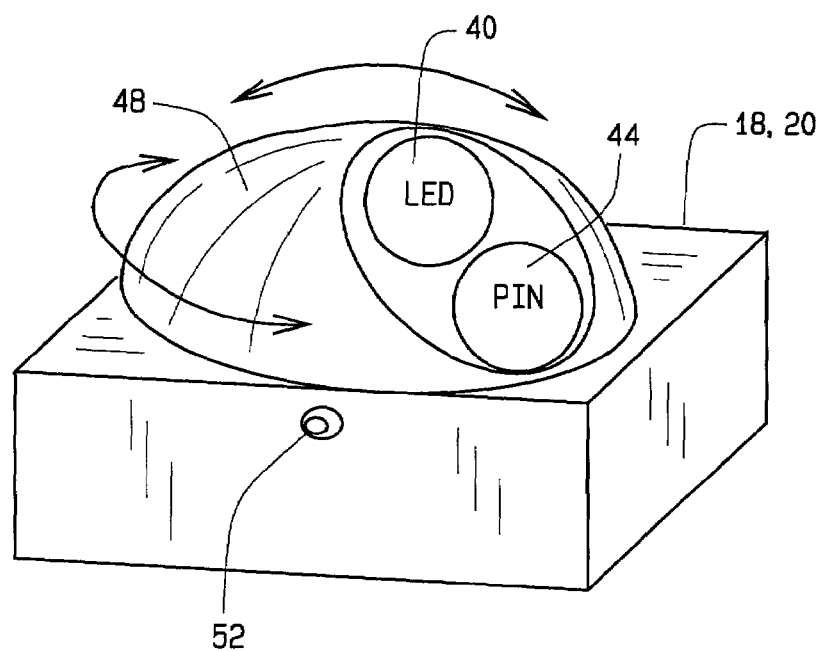
FIG. 5 is a diagram of a direct IR transceiver utilized in network system 10 shown in FIG. 1.

FIG. 5 is a diagram of a direct IR transceiver, such as PSU transceiver 18 or seat transceiver 20, utilized in network system 10 (shown in FIG. 1). In one embodiment, IR transceivers, 18 and 20 combine a high power light emitting diode (LED) transmitter 40 and a Positive-Intrinsic-Negative (PIN) photodiode receiver 44 in a pivoting head assembly 48 that is similar in form and function to a reading light in the overhead of an aircraft passenger compartment. The mechanical design is the same for the assemblies of both transceivers 18 and 20, but different optical and electrical components are used. For example, PSU transceiver 18 may transmit at an optical wavelength of 850 nm and receive at 1310 nm, while seat transceiver 20 may transmits at 1310 nm and receives at 850 nm. This reduces interference between the up and down links.

It is envisioned that the heads of IR transceivers 18 and 20 are mounted on a ball that can be pivoted and locked into a fixed position by locking screw 52. To align transceivers 18 and 20, pivoting head assembly 48 of PSU transceiver 18 is adjusted so that the illuminating beam of LED transmitter 40 is centered on seat transceiver 20, and then locked into place using locking screw 52. If seat transceiver 20 is located on the top of a passenger seat, then the aligning process is conducted with the seat in a half reclined position.

In an alternate embodiment, two or more low power LEDs are used in place of high power LED 40. Using two or more low power LEDs provide a system in which LED failures produce a "graceful" degradation in performance, rather than an abrupt catastrophic failure that occurs with a single high power LED. A "graceful" degradation system allows servicing and maintenance to occur at regularly scheduled intervals rather than on an emergency basis that would be the case for a single point failure. Additionally, pointing multiple low power LEDs in the same direction can provide the spatial distribution of a single device.

Stray light from an LED, such as LED 40, can cause direct path interference. Therefore, in one embodiment, an optical baffle (not shown) is included in a mounting hole of LED 40. The baffle reflects or absorbs stray light back into LED 40, thereby attenuating the stray light.

The low bandwidth requirements of the direct IR signal transmitted between PSU transceiver 18 and seat transceiver 20 allow network system 10 to use very large area photodiodes. The receiver collection optics, of transceivers 18 and 20, gather light over an acceptance angle, and focus it on to a photo detector. The optical power into the detector is proportional to the area of the receiver aperture. A large area photo detector is required for the downlink receiver. Therefore, the receiver aperture of seat transceiver 20 is sized as large as possible while permitting seat transceiver 20 to be mounted on top of video display unit 44 (shown in FIG. 3). Additionally, it is desirable that the photodiode incorporate a low noise amplifier in the same package to reduce electromagnetic interference (EMI) between the transmitter and receiver Furthermore, intense background radiation from direct sunlight on the overhead panels and from passenger reading lights can degrade the performance of the direct path IR link. Therefore, optical filtering, such as interference filters and colored filters, are used to reduce background light.

While the invention has been described in terms of various specific embodiments, those skilled in the art will recognize that the invention can be practiced with modification within the spirit and scope of the claims.

What is claimed is:

1. A system for providing wireless communication within a local area network (LAN) on board a mobile platform, said system comprising:
   at least one seat transceiver mounted to each of a plurality of passenger seats located in a passenger seating area, said seat transceivers interconnected with each other;
   at least one passenger service unit (PSU) located above the passenger seating area, said PSU comprising at least one PSU transceiver configured to substantially simultaneously have a direct path infrared (IR) signal transmission link with at least two adjacent said seat transceivers, thereby providing a redundant optical signal path to each one of said adjacent seat transceivers via said interconnection of said seat transceivers,
   said direct path IR transmission link configured to transmit data between said seat transceivers and said PSU transceiver.

2. The system of claim 1, wherein said seat transceiver is mounted on a top portion of a display unit attached to a passenger seat.

3. The system of claim 1, wherein said seat transceiver configured to connect to at least one interface, said interface configured for connection with a client system using at least one of a Ethernet RJ-45 connection, a firewire connection, and a USB connection.

4. The system of claim 1 further comprising a server configured to exchange communication with said PSU.

5. The system of claim 4 wherein said PSU configured to filter data packets from a signal transmitted between said server and said PSU prior to transmitting the direct IR signal to said seat transceiver, such that an entire amount bandwidth of the signal between said sever and said PSU is not transmitted to said seat transceiver.

6. The system of claim 4 wherein said server further configured to exchange communication with a ground station via a satellite communications link, said ground station configured to access a terrestrial Internet.

7. The system of claim 6 wherein said server further configured to provide Internet data service to said client system utilizing the satellite communication link to said ground station.

8. A method for providing wireless communication within a local area network (LAN) located on a mobile platform, said method comprising:
   locating a passenger service unit (PSU) that includes a PSU transceiver above a passenger seating area;
   substantially simultaneously providing a direct path IR signal transmission link between at least two adjacent seat transceivers mounted on adjacent passenger seats and the PSU transceiver;
   interconnecting the seat transceivers such that a redundant optical signal path is provided to each of the adjacent seat transceivers; and
   transmitting data between the seat transceivers and the PSU transceiver using the direct path IR transmission link.

9. The method of claim 8, wherein providing a direct path IR transmission link comprises mounting the seat transceiver on a top portion of a display unit attached to a passenger seat.

10. The method of claim 8, wherein providing a direct path IR transmission link comprises:
    providing at least one interface port connected to the seat transceiver; and
    connecting a client system to the interface port using at least one of a Ethernet RJ-45 connection, a firewire connection, and a USB connection.

11. The method of claim 8, wherein transmitting data comprises:
    transmitting data from one of the adjacent seat transceivers to the other adjacent seat transceiver when the direct IR link to one of the adjacent seat transceivers is blocked.

12. The method of claim 8, wherein the LAN further includes a server for exchanging communication with the PSU, and wherein transmitting data comprises filtering data packets from a signal transmitted between the server and the PSU prior to transmitting the direct IR signal to the seat transceiver, such that an entire amount of bandwidth of the signal between the sever and the PSU is not transmitted to the seat transceiver.

13. The method of claim 12, wherein the server utilizes a satellite communication link to exchange communication with a ground station capable of accessing a terrestrial Internet, and wherein transmitting data comprises utilizing the satellite communication link to provide Internet data service from the terrestrial Internet to the client system.

14. A method for providing wireless communication within a local area network (LAN) located on a mobile platform, said method comprising:
    locating at least one passenger service unit (PSU) above a passenger seating area, each PSU including a PSU transceiver and adapted to exchange communications with at least one LAN server on board the mobile platform;
    substantially simultaneously providing a direct path IR signal transmission link between the PSU transceiver and at least two adjacent seat transceivers adapted to exchange communication with the PSU transceiver, wherein each seat transceiver is interconnected and mounted to a respective one of a plurality of passenger seats;

providing a redundant optical signal path between the PSU transceiver and the adjacent seat transceivers utilizing the direct path IR signal transmission link to the adjacent seat transceivers and the interconnection of the adjacent seat transceivers; and providing at least one interface port connected to the seat transceivers, such that a passenger can connect a client system to the interface port and thereby access the LAN server.

15. The method of claim 14, wherein providing a direct path IR transmission link comprises mounting the seat transceiver on a top portion of a display unit attached to a passenger seat.

16. The method of claim 14, wherein providing a redundant optical signal path comprises:

transmitting data from one of the adjacent seat transceivers to the other adjacent seat transceiver when the direct IR link to one of the adjacent seat transceivers is blocked.

17. The method of claim 14, wherein providing a direct path IR transmission link comprises:

connecting a client system to the interface port using at least one of a Ethernet RJ-45 a firewire connection, and a USB connection; and transmitting data between the seat transceiver and the PSU transceiver using the direct path IR transmission link.

18. The method of claim 17, wherein the server utilizes a satellite communication link to exchange communications with a ground station capable of accessing a terrestrial Internet, and wherein transmitting data comprises:

utilizing the satellite communication link to provide Internet data service from the terrestrial Internet to the client system; and filtering data packets from a signal transmitted between the server and the PSU prior to transmitting the direct IR signal to the seat transceiver, such that an entire amount of bandwidth of the signal between the sever and the PSU is not transmitted to the seat transceiver.

* * * * *